US012783793B2

(12) United States Patent
Muthu et al.

(10) Patent No.: US 12,783,793 B2
(45) Date of Patent: Nov. 3, 2026

(54) ENHANCED AUTOMATIC FORM PROCESSING USING A KNOWLEDGE GRAPH DATA STRUCTURE AND A LARGE LANGUAGE MODEL

(71) Applicant: Intuit Inc., Mountain View, CA (US)

(72) Inventors: Malathy Muthu, Mountain View, CA (US); Adam Neeley, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 388 days.

(21) Appl. No.: 18/592,489

(22) Filed: Feb. 29, 2024

(65) Prior Publication Data

US 2025/0278558 A1 Sep. 4, 2025

(51) Int. Cl.

*G06F 17/27* (2006.01)
*G06F 16/242* (2019.01)
*G06F 40/174* (2020.01)

(52) U.S. Cl.

CPC .......... *G06F 40/174* (2020.01); *G06F 16/243* (2019.01)

(58) Field of Classification Search

CPC .......... G06N 5/022; G06N 3/08; G06N 3/045; G06N 20/00; G06F 40/30; G06F 40/174; G06F 16/243; G06F 16/9024; G06F 40/205; G06F 16/258; G06F 40/279; G06F 40/40; G06F 16/00; G06F 16/93; G06F 40/14; G06F 40/151; G06F 16/22; G06F 16/25; G06F 16/583; G06F 40/10; G06F 8/24; G06F 16/289; G06F 16/28

See application file for complete search history.

(56) References Cited

U.S. PATENT DOCUMENTS 9,830,319 B1 * 11/2017 Tortosa .................... G06F 16/86
2022/0180093 A1 * 6/2022 Zeng .................... G06V 30/414

FOREIGN PATENT DOCUMENTS

EP 4535235 A1 * 4/2025 ............. G06N 5/022
WO WO-2024259902 A1 * 12/2024 ............. G06F 9/451

* cited by examiner

*Primary Examiner* — Michael Ortiz-Sanchez
(74) *Attorney, Agent, or Firm* — Lathrop GPM LLP

(57) ABSTRACT

A method including receiving an object notation data structure including key-value pairs. Each key represents a field of an electronic form. Each value includes at least a first sub-value and a second sub-value for the field. The first sub-value represents a name of the field. The second sub-value represents a range of allowed values for the field. The method also includes applying a large language model to the object notation data structure to generate an output data structure. The output data structure includes a text string defining fields of the electronic form as nodes and further defining relationships among the key-value pairs as edges between the nodes. The method also includes applying an object notation model to the output data structure to convert the output data structure into a knowledge graph data structure including the nodes connected by the edges. The knowledge graph data structure is returned.

20 Claims, 7 Drawing Sheets

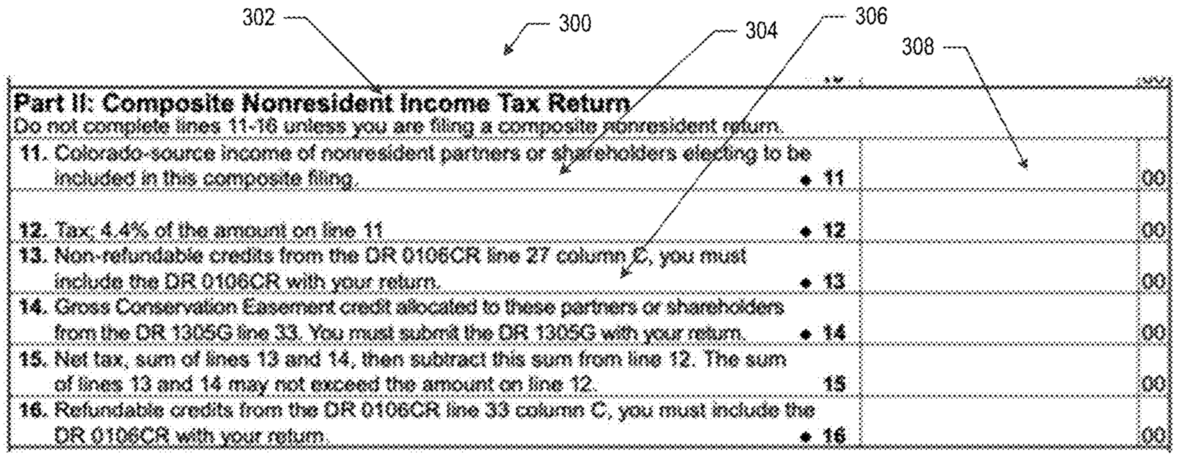

FIG. 3

```
{
  "colorado_source_income": {
    "field_name": "colorado_source_income",
    "filing_details": "Enter the Colorado-source income of the nonresident partners or
shareholders who are included in this composite return. This amount should be the sum
of column B, lines 1-11 of the Colorado K-1 (DR 0106K) for all nonresident partners or
shareholders included in this composite return. Do not include any resident partners or
shareholders.",
    "required": true,
    "possible_values": "Numeric value >= 0 representing income amount",
    "calc_logic": "colorado_source_income = 0\nfor each DR_0106K:\n  if DR_0106K is for
nonresident partner:\n    for line in [1, 2, 3, ... 11]:\n      colorado_source_income +=
DR_0106K.column_B[line]"
  },
  "tax": {
    "field_name": "tax",
    "filing_details": "Multiply the amount on line 11 by 4.4% (0.044) and enter the result on this
line 12.",
    "required": true,
    "possible_values": "Numeric value >= 0 representing tax amount",
    "calc_logic": "tax_rate = 0.044\ntax = colorado_source_income * tax_rate"
  },
  "nonrefundable_credits": {
    "field_name": "nonrefundable_credits",
    "filing_details": "Enter the non-refundable tax credits from the Colorado Pass-
    Through Entity Credit Schedule (DR 0106CR) line 27, Column C that are allocated
    to the nonresident partners or shareholders included in the composite return. Do not
    include any amounts from Column B on this line. You must submit the DR 0106CR
    with your return.",
    "required": false,
    "possible_values": "Numeric value >= 0 representing credit amount",
    "calc_logic": "nonrefundable_credits = DR_0106CR.line_27.column_C"
  },
```

402, 410, 414, 418, 422, 426, 400, 406, 404, 412, 416, 420, 424, 428, 408

FIG. 4A

400

```
  "gross_conservation_easement_credit": {
    "field_name": "gross_conservation_easement_credit",
    "filing_details": "Enter the gross conservation easement credit available to the
nonresident partners or shareholders included in the composite return from the DR 1305G
line 33. You must submit the DR 1305G with your return.",
    "required": false,
    "possible_values": "Numeric value >= 0 representing credit amount",
    "calc_logic": "gross_conservation_easement_credit = DR_1305G.line_33"
  },

  "net_tax": {
    "field_name": "net_tax",
    "filing_details": "Add lines 13 and 14, then subtract this sum from line 12. The sum of
13 and 14 may not exceed the amount on line 12. Enter the result from this line 15 on line
21 of this form.",
    "required": true,
    "possible_values": "Numeric value >= 0 representing net tax amount",
    "calc_logic": "credits = nonrefundable_credits + gross_conservation_easement_credit\
nnet_tax = tax\nif credits <= tax:\n  net_tax -= credits\nelse:\n  net_tax = 0"
  },

  "refundable_credits": {
    "field_name": "refundable_credits",
    "filing_details": "Enter the refundable tax credits from the DR 0106CR line 33, Column
C that are allocated to the nonresident partners or shareholders included in the composite
return. Do not include any amounts from Column B on this line. You must submit the DR
0106CR with your return.",
    "required": false,
    "possible_values": "Numeric value >= 0 representing credit amount",
    "calc_logic": "refundable_credits = DR_0106CR.line_33.column_C"
  }
}
```

FIG. 4B

450

Can you extract how to calculate all the form inputs <section of the form needed> in JSON format **using the filing instructions? 452

Extract the information as key-value with the following format,
field_name (should be easy to understand and is relevant to the context and should be self-explanatory)
, filing_details should have all filing instructions in-depth on how to calculate that field and what all information can be part of the calculation-**make sure that the instructions and calculation logic are present for all columns if there are multiple columns present
, required is true or false depending on whether a field is mandatory or not for filing
, possible_values that each field can have
, calc_logic (create a python expression, give the in-depth logic for the calculations, include if conditions and looping if needed that explains the calculation logic needed for the filing). 454

FIG. 4C

500 nodes=[Node(id=1, label='colorado_source_income', color='lightblue'), Node(id=2, label='nonresident partners or shareholders', color='lightgreen'), Node(id=3, label='tax', color='lightblue'), Node(id=4, label='tax_rate', color='orange'), Node(id=5, label='nonrefundable_credits', color='lightblue'), Node(id=6, label='DR_0106CR.line_27.column_C', color='purple'), Node(id=7, label='gross_conservation_easement_credit', color='lightblue'), Node(id=8, label='DR_1305G.line_33', color='purple'), Node(id=9, label='net_tax', color='lightblue'), Node(id=10, label='credits', color='orange'), Node(id=11, label='refundable_credits', color='lightblue'), Node(id=12, label='DR_0106CR.line_33.column_C', color='purple')]
edges=[Edge(source=2, target=1, label='contributes to', color='darkblue'), Edge(source=1, target=3, label='is used to calculate', color='darkblue'), Edge(source=6, target=5, label='is used to calculate', color='darkblue'), Edge(source=8, target=7, label='is used to calculate', color='darkblue'), Edge(source=5, target=10, label='forms part of', color='darkblue'), Edge(source=7, target=10, label='forms part of', color='darkblue'), Edge(source=10, target=9, label='reduces', color='darkblue'), Edge(source=12, target=11, label='is used to calculate', color='darkblue')]

FIG. 5

ENHANCED AUTOMATIC FORM PROCESSING USING A KNOWLEDGE GRAPH DATA STRUCTURE AND A LARGE LANGUAGE MODEL

BACKGROUND

Electronic forms may be complex. Furthermore, complex electronic forms may interact with other complex electronic forms. Thus, when electronic forms are prepared using an automated process, such as when electronic tax forms are prepared using automated tax preparation software, computer errors in preparing or submitting the electronic forms may occur. The errors may be caused by a number of factors, such as an incorrect analysis and programming of the algorithm used to complete an electronic form automatically, data formatting problems between different electronic forms, inadvertent failure to complete a mandatory form (e.g., failure to enter a value of "zero" by leaving a field blank), and many other possible errors.

Thus, technical issues exist with respect to creating or editing electronic versions of forms. Additionally, technical issues exist with respect to correctly and automatically processing the electronic forms, once available in electronic form.

SUMMARY

One or more embodiments provide for a method. The method includes receiving an object notation data structure including key-value pairs. Each key in the key-value pairs represents a field of an electronic form. Each value in the key-value pairs includes at least a first sub-value and a second sub-value for the field that corresponds to the value. The first sub-value represents a name of the field of the electronic form. The second sub-value represents a range of allowed values for the field of the electronic form. The method also includes applying a large language model to the object notation data structure to generate an output data structure. The output data structure includes a text string defining fields of the electronic form as nodes and further defining relationships among the key-value pairs as edges between the nodes. The method also includes applying an object notation model to the output data structure to convert the output data structure into a knowledge graph data structure including the nodes connected by the edges. The method also includes returning the knowledge graph data structure.

One or more embodiments provide for another method. The method includes applying a parsing algorithm to an electronic form to generate an object notation data structure including key-value pairs. Each key in the key-value pairs represents a field of an electronic form. Each value in the key-value pairs includes at least a first sub-value, a second sub-value, a third sub-value, a fourth sub-value, and a fifth sub-value for the field of the electronic form that corresponds to the value. The first sub-value represents a name of the field of the electronic form. The second sub-value represents a range of allowed values for the field of the electronic form. The third sub-value represents natural language instructions for determining the range of allowed values for the field of the electronic form. The fourth sub-value represents a determination whether the range of values is required. The fifth sub-value represents calculation logic which, when executed by a computer processor, determines a specific value for the field of the electronic form. The method also includes generating a prompt. The prompt instructs a large language model how to apply the large language model to the key-value pairs. The method also includes applying, using the prompt, the large language model to the object notation data structure to generate an output data structure. The output data structure includes a text string defining fields of the electronic form as nodes and further defining relationships among the key-value pairs as edges between the nodes. The method also includes applying an object notation model to the output data structure to convert the output data structure into a knowledge graph data structure including the nodes connected by the edges. The method also includes applying the large language model to the relationships to generate summaries of the relationships. The method also includes converting the knowledge graph data structure into a visual form. The visual form displays the nodes as first shapes and the edges as second shapes that connect the first shapes. The visual form also displays node text identifying the nodes as the fields. The visual form also displays edge text including the summaries. The method also includes displaying the visual form on a display device.

One or more embodiments also provide for a system. The system includes a computer processor and a data repository in communication with the computer processor. The data repository stores an object notation data structure including key-value pairs. Each key in the key-value pairs represents a field of an electronic form. Each value in the key-value pairs includes at least a first sub-value and a second sub-value for the field of the electronic form that corresponds to the value. The first sub-value represents a name of the field of the electronic form. The second sub-value represents a range of allowed values for the field of the electronic form. The data repository also stores an output data structure including a text string defining fields of the electronic form as nodes and further defining relationships among the key-value pairs as edges between the nodes. The data repository also stores a knowledge graph data structure including the nodes connected by the edges. The system also includes a large language model which, when executed by the computer processor, takes the object notation data structure as a first input and generates the output data structure as a first output. The system also includes an object notation model which, when executed by the processor, takes the output data structure as a second input and generates, as a second output, the knowledge graph data structure.

Other aspects of one or more embodiments will be apparent from the following description and the appended claims.

BRIEF DESCRIPTION OF DRAWINGS

FIG. 3 shows an example of a tax form that is to be converted into an electronic form suitable for processing by an automated form processing application, in accordance with one or more embodiments.

FIG. 4A and FIG. 4B show an example of an object notation data structure created from the electronic form shown in FIG. 3, in accordance with one or more embodiments.

FIG. 4C shows an example of a prompt used during execution of a large language model on an electronic form in order to generate the object notation data structure of FIG. 4A and FIG. 4B, in accordance with one or more embodiments.

FIG. 5 shows an example of an output data structure, generated using a large language model applying the object notation data structure shown in FIG. 4A and FIG. 4B, in accordance with one or more embodiments.

Like elements in the various figures are denoted by like reference numerals for consistency.

DETAILED DESCRIPTION

Figure 1:
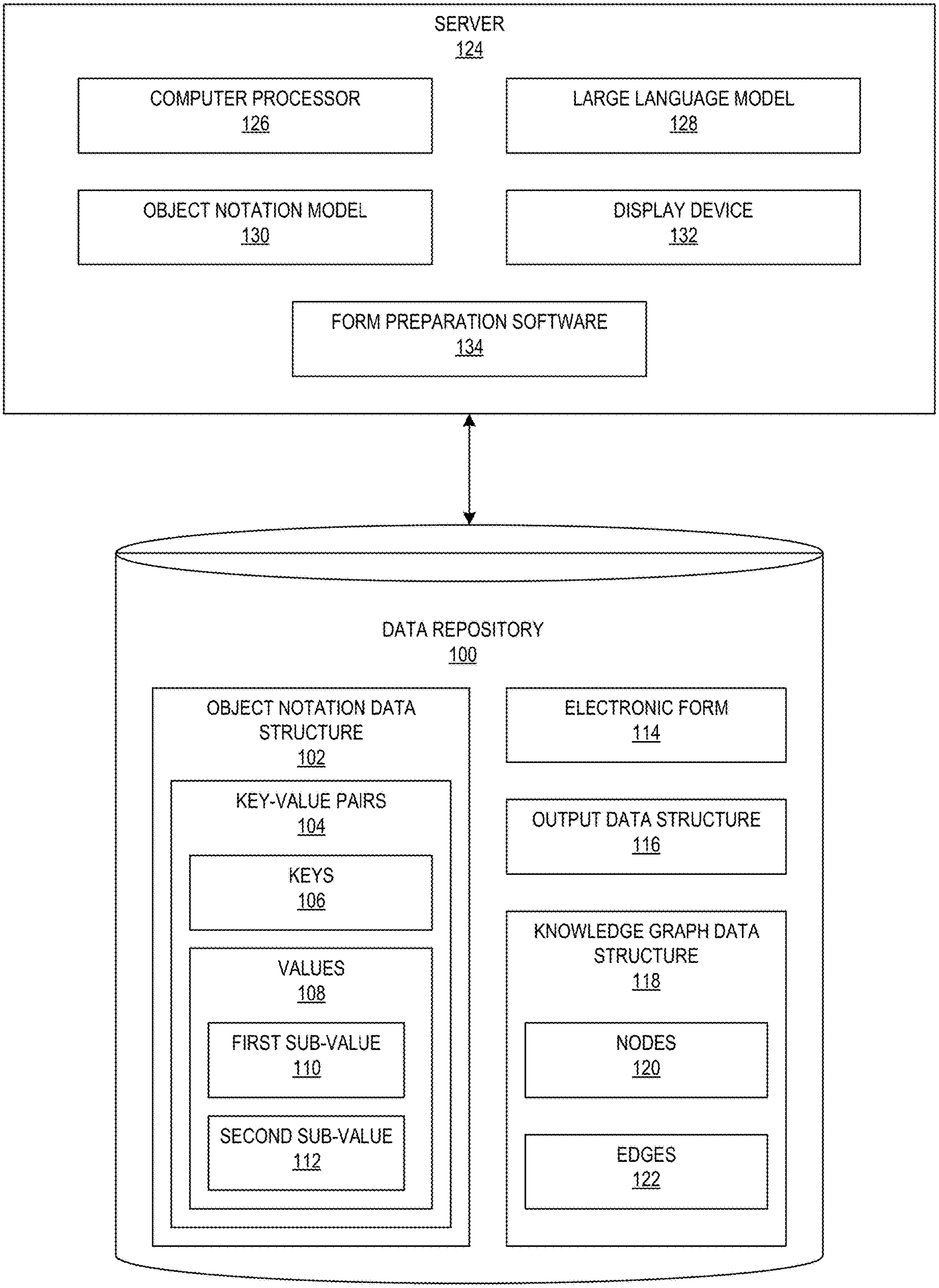
FIG. 1 shows a computing system, in accordance with one or more embodiments.

One or more embodiments are directed to methods and systems for enhanced automatic form processing using a knowledge graph data structure and a large language model, in accordance with one or more embodiments. As indicated above, the generation and processing of electronic forms suitable for use with computer-readable form processing software may be fraught with computer errors. The computer errors may be difficult to identify and resolve.

Thus, a technical challenge exists in creating automated procedures for understanding and generating electronic forms, from the point of view of a computer-readable process. Another technical challenge exists in creating electronic tools for quickly identifying any errors that do occur in the generation or use of the electronic forms. Still another technical challenge exists in creating an automated process that reduces the number of errors that may be generated during an automatic process of creating a computer-readable or computer-executable electronic form. Yet another technical challenge exists in automatically creating a visualization of an electronic form so that a human computer scientist or technician is able to identify quickly a proper computerized algorithm for the electronic form.

In summary, one or more embodiments provide for converting the original form into a knowledge graph data structure that a computer may read or execute. The knowledge graph data structure also may be presented in a graphical format which is easy for a human computer scientist to read and understand. In either the computer-readable or human-readable format, the knowledge graph data structure both shows and embodies the algorithm and relationships used to process the newly created electronic form.

Briefly, one or more embodiments provide for generating or receiving an object notation data structure which defines the fields of the form, the names of the fields, and at least a range of allowed values for the fields. Thus, the object notation data structure defines the fields and entries of the form as key-value pairs, expressed in a computer-readable format. A large language model is then applied to the object notation data structure. The output of the large language model is an output data structure. The output data structure may be a text string that defines fields of the electronic form as nodes and further defines relationships among key-value pairs in the object notation data structure as edges. A data model may be applied to the output data structure which generates a visual map of the knowledge graph data structure. However, the output data structure may be processed in a number of different manners, as described further below.

One or more embodiments resolve the technical issues described above. Because the electronic form is expressed as a knowledge graph data structure, the relationships of fields and the relationships of key-value pairs, in the original form is more likely to be expressed correctly in a computer readable format. Similarly, an automated process is more likely to identify problems in relationships defined between the nodes and in the relationships of the key-value pairs, because the relationships are explicitly defined. Because the electronic form may be expressed in a visual format, a human computer scientist or technician may visually see the relationships described above and also may visually see the algorithm of the electronic form. Accordingly, a human computer scientist or technician may more quickly identify errors in the electronic form or in the logic defining the automated processing of the electronic form.

Additionally, one or more embodiments may also provide for automatically determining the logical flow and characteristics of a complex electronic form. Specifically, one or more embodiments can generate, automatically, the logical flow and understanding of an electronic form that may use user input and has specific instructions.

Attention is now turned to the figures. FIG. 1 shows a computing system, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) may store an object notation data structure (102). The object notation data structure (102) is a computer-readable data structure. Specifically, the object notation data structure (102) is a computer-readable data structure that stores data in the form of an object notation structured format. An example of the object notation data structure (102) may be a JAVASCRIPT® object notation (JSON) file, though there may be other types of object notation data structures that may be used.

The object notation data structure (102) includes one or more key-value pairs (104). The key-value pairs (104) are sets of keys that correspond to sets of values. In many cases, the keys and the values are uniquely associated with each other. For example, one key is paired with one and only one value. While pairing multiple values to a single key, or pairing multiple keys to a single value, is possible, in most cases the keys and values are associated in a one-to-one relationship. Nevertheless, whether the keys and values have a one-to-one relationship, a many-to-one relationships, a one-to-many relationship, or a many-to-many relationship, the keys and the values are paired together in the sense that the keys and the values have known relationships. Again, however, in most cases the keys and values have a one-to-one relationship, meaning that the key-value pairs (104) likely represent sets of one key and one corresponding value for the one key.

Each of the keys (106) is a logical entity in the key-value pairs (104) that represents a field of the electronic form. An example of a key is shown in FIG. 4A, in the context of the form shown in FIG. 3.

Each of the values (108) is a logical entity in the key-value pairs (104) that represents a value of the corresponding field of the electronic form, or represents metadata or other information about the corresponding field of the electronic form, or combinations thereof.

Thus, each of the values (108) may have a sub-value, such as the first sub-value (110) and the second sub-value (112)

shown in FIG. 1. Each sub-value contains data that represents one of possibly multiple pieces of information regarding the corresponding keys (106). In a sense, when the values (108) contain sub-values, then the keys (106) and the values (108) may be considered to have a one-to-many relationship (i.e., each key is associated with multiple values).

Examples of the keys (106) and the values (108), including sub-values such as the first sub-value (110) and the second sub-value (112), are shown in FIG. 4A in the context of FIG. 3.

The data repository (100) also may store the electronic form (114), among possibly multiple electronic forms. The electronic form (114) is a computer-readable version of a form, whether or not the original form was expressed in a computer-readable format. The electronic form (114) may contain computer-executable code in some instances. The electronic form (114) may be processed using the form preparation software (134), described below.

The data repository (100) also may store an output data structure (116). The output data structure (116) is a data structure generated by the large language model (128), described below. Specifically, the output data structure (116) may be a text string that defines fields of the electronic form (114) as nodes and further defines relationships among the key-value pairs (104) as edges between the nodes. A text string is a series of alphanumeric characters or special characters (e.g., "!", "*", "{", etc.)

Thus, for example, a text string may represent the fields as nodes and the relationships among the fields as edges. However, the edges also may represent relationships among the key-value pairs (104). For example, the relationships, expressed as edges, may define calculation logic that indicates how the value of one field may influence the value of another field, wherein the calculation logic represents the relationship between two key-value pairs that define the two fields. An example of the output data structure (116) is shown in FIG. 5.

The data repository (100) also may show a knowledge graph data structure (118). The knowledge graph data structure (118) is a type of graph data structure. A graph data structure is different than the object notation data structure (102). Specifically, while the object notation data structure (102) stores data in the form of the key-value pairs (104), the knowledge graph data structure (118) stores data in the form of nodes and edges that define the relationships among the nodes.

Furthermore, there are differences between the output data structure (116) and the knowledge graph data structure (118). While the output data structure (116) does represent the fields of the electronic form (114) as nodes and does represent relationships among the key-value pairs (104) as edges, the output data structure (116) is a text string, as described above. See, for example, the text string shown in FIG. 5. However, the knowledge graph data structure (118) breaks the storage of the data representing the fields into discrete nodes and further breaks the storage of the data representing relationships among the fields (or the key-value pairs) as discrete edges. Thus, the fundamental computer-readable data structures of the output data structure (116) and the knowledge graph data structure (118) are fundamentally different.

The knowledge graph data structure (118), as indicated above, includes one or more nodes, such as nodes (120). A node is a vertex of the knowledge graph data structure (118). The vertex is a data object that stores data. Each of the nodes (120) may have one or more properties that describes one or more nodes. In one or more embodiments, the nodes (120) represent the fields of the electronic form (114).

The knowledge graph data structure (118), as indicated above, includes one or more edges, such as edges (122). An edge is a data object that stores information that represents the relationships among the nodes (120). The edges (122) also may include properties that qualify the nature of the relationships among the nodes (120). In one or more embodiments, the edges (122) represent the relationships among the key-value pairs (104), which also may include relationships among the fields.

The system shown in FIG. 1 also may include a server (124). The server (124) is a computing system, possibly executing in a distributed computing environment. The server (124) may be, for example, the computing system and network environment shown in FIG. 7A and FIG. 7B.

The server (124) includes a computer processor (126). The computer processor (126) is one or more hardware or virtual computer processors. The computer processor (126) may execute computer readable program code that embody instructions that are reflected in the method of FIG. 2 or the example of FIG. 4C.

The server (124) also may include a large language model (128). A large language model (LLM) is a type of artificial intelligence (AI) algorithm that uses deep learning techniques and massively large data sets to understand, summarize, generate, and predict new content. The term generative AI also is closely connected with LLMs, which are, in fact, a type of generative AI that has been specifically architected to help generate text-based content.

The server (124) also may include an object notation model (130). The object notation model (130) is a computer-readable object which includes computer readable data and possibly executable code. The object notation model (130) stores data in an object notation format, such as that used by the object notation data structure (102). The object notation model (130) is defined by at least a class, an identifier, and data stored in the object notation model (130). Thus, the object notation model (130) is a class which defines fields as annotated attributes. The object notation model (130) may be similar to a struct in the "C" computing language or the requirements of a single endpoint in an application programming interface (API).

An example of the object notation model (130) may be a PYDANTIC® model. Another example of the object notation model (130) may be a PYTHON® "dataclass." One function of the object notation model (130) may be to serve as a model to which untrusted data may be passed and, after parsing and validation, confirms the untrusted data to the field types defined for the model. As used herein, with respect to the term "object notation model," the term "validation" refers to the process of instantiating the object notation model (130) that adheres to specified types and constraints as defined by the object notation model (130).

The server (124) also may include a display device (132). The display device (132) is a monitor, television, touchscreen, speaker, haptic device, etc. which may be used to display information to a user. For example, the display device (132) may display the knowledge graph data structure (118) to a user, or to return a visual representation of the knowledge graph data structure (118).

The server (124) also may include or host form preparation software (134). The form preparation software (134) is software or application specific hardware which, when executed by the computer processor (126), manipulates or uses the electronic form (114). For example, the form preparation software (134) may be tax preparation software which may manipulate (fill-in, complete, calculate a value based on a reference, etc.) the electronic form (114) in the form of an electronic tax document. The form preparation software (134) may, for example, be programmed to automatically fill in the electronic form (114) after the electronic form (114) is created, according to the methods described with respect to FIG. 2.

While FIG. 1 shows a configuration of components, other configurations may be used without departing from the scope of one or more embodiments. For example, various components may be combined to create a single component. As another example, the functionality performed by a single component may be performed by two or more components.

Figure 2:
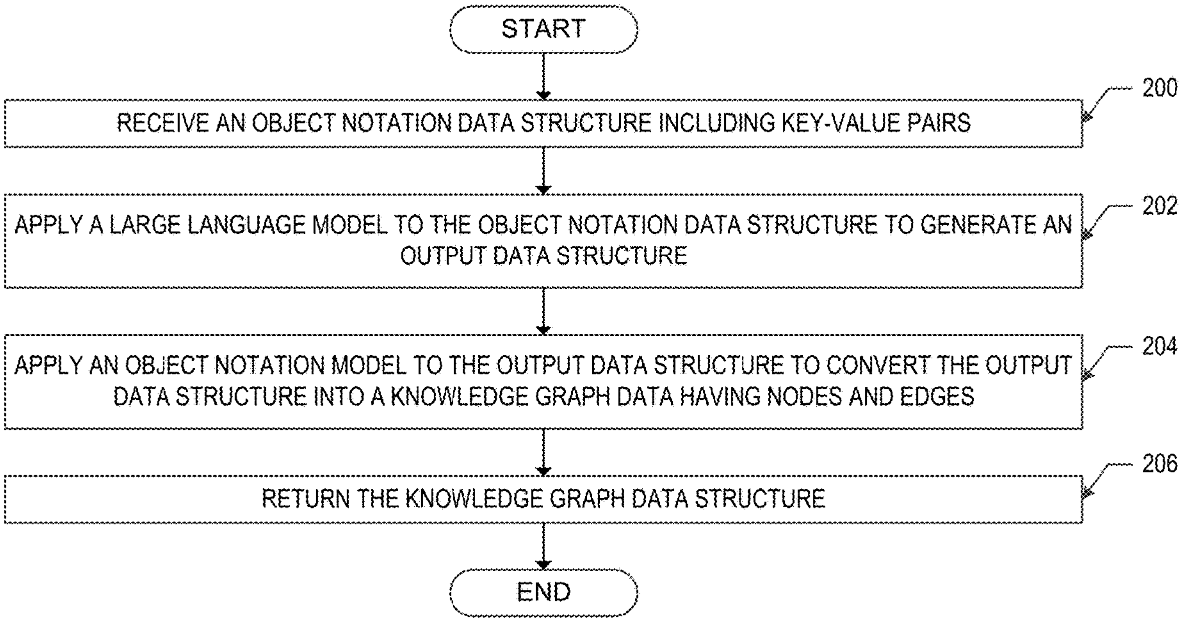
FIG. 2 shows a flowchart of a method for enhanced automatic form processing using a knowledge graph data structure and a large language model, in accordance with one or more embodiments.

FIG. 2 shows a flowchart of a method for enhanced automatic form processing using a knowledge graph data structure and a large language model, in accordance with one or more embodiments. The method of FIG. 2 may be implemented using the computing system shown in FIG. 1.

Step 200 includes receiving an object notation data structure including key-value pairs. The object notation data structure may be received by retrieving or receiving, via a communication link, the object notation data structure from a data repository or from a remote data source (e.g., the object notation data structure may be received from a third-party that provides the object notation data structure).

However, the object notation data structure may be received by generating the object notation data structure. The object notation data structure may be generated by applying a parsing algorithm to an electronic form. Parsing the object notation data structure identifies keys (fields) and values (at least a range of values for each field). Thus, parsing the object notation data structure generates key-value pairs. The key-value pairs then may be stored in an object notation data structure. Note, however, that the values in the key-value pairs may have sub-values, as defined above with respect to FIG. 1, and as further explained below.

The parsing algorithm used to parse the electronic form may be a large language model. The large language model may be the same large language model that is used to generate the output data structure, as defined with respect to FIG. 1 and as described with respect to step 202 below. However, other parsing algorithms may be used.

As mentioned above, generating the object notation data structure may include generating sub-values for the value. In an example, generating the object notation data structure may include applying the large language model to the electronic form. The output of the large language model indicates that at least one field of the fields requires a calculation. Thus, the large language model generates a key-value pair that includes a field that requires a calculation. In this case, one of the sub-values may be a logical expression that defines the calculation as computer-readable instructions.

In another example, generating the object notation data structure may include applying the large language model, or some other language extraction algorithm, to extract natural language instructions for the field from a heterogeneous data source. In a specific example, instructions for completing a form may be extracted from a source other than the form itself and the instructions are then added as a sub-value of the value for the field. In a more specific example, instructions for filling in "box 1" of a tax form may be extracted from a website, where the website does not contain the form itself, and the form itself does not contain the instructions.

In still another example, generating the object notation data structure may include applying the large language model to the natural language instructions to generate summarized instructions. Then, the summarized instructions may be added as another sub-value for the value of the corresponding field. For example, a large language model may be used to summarize a full set of instructions for a field of a form. The summarized instructions then are inserted as a sub-value of the corresponding field.

Combinations of the above sub-values are possible. For example, each field of an electronic form may contain five sub-values: a first sub-value that represents a name of the field, a second sub-value that represents a range of allowed values for the field, a third sub-value that represents natural language instructions for determining the range of allowed values for the field, a fourth sub-value that represents a determination whether the range of allowed values is required, and a fifth sub-value that represents calculation logic which, when executed by a processor, determines a specific value for the field. However, more or fewer sub-values may be present. Different sub-values also may be present. Thus, one or more embodiments are not necessarily limited to the above-presented example.

Applying the large language model to the electronic form to generate the object notation data structure may also include providing a prompt to the large language model. The prompt instructs the large language model regarding the tasks the large language model is to perform when processing the electronic form. For example, the prompt may instruct the large language model regarding how to apply the large language model to the fields and blanks in the form.

The prompt may be specifically defined for the electronic form in question. For example, the prompt may instruct the large language model to identify fields in the electronic form and to identify blanks in the form as values which must include at least a value range. In another example, the large language model may be instructed to analyze the electronic form for instructions for completing the electronic form. The instructions in the form may be added as sub-values for one or more of the fields in the electronic form.

Many different instructions may be present in the prompt in order to define the parameters and constraints to be placed on the large language model when the large language model is executed on the object notation data structure. A specific example of a prompt used in the generation of the object notation data structure is shown in FIG. 4C.

Step 202 includes applying a large language model to the object notation data structure to generate an output data structure. The output data structure includes a text string defining fields of the electronic form as nodes and further defining relationships among the key-value pairs as edges between the nodes.

The large language model may be applied to the object notation data structure by supplying the object notation data structure as input to the large language model. Again, a prompt (different than the prompt used to generate the object notation data structure) may specify the commands and parameters that the large language model should apply during execution of the large language model. For example, the prompt for generating the output data structure may be, "Can you convert the input <object notation data structure> into a text string that defines keys in the input as nodes and defines relationships among the key-value pairs in the input as edges between the nodes?"

Step 204 includes applying an object notation model to the output data structure to convert the output data structure into a knowledge graph data structure including the nodes connected by the edges. The object notation model includes a class defined from an object notation library. The knowledge graph data structure includes the nodes connected by the edges.

The object notation model, such as but not limited to a PYDANTIC® model, is applied to the output data structure by providing the object notation data structure as input to the object notation model. The object notation model, in turn, forces the information in the object notation model to conform to the structure of a knowledge graph data structure.

For example, the output data structure, as described above, is a text string that identifies keys as nodes and key-value pair relationships as edges. The object notation model is coded, and has references to any useful libraries, such that when the object notation model is executed the object notation model forces the information in text string to conform to the data structure of a knowledge graph data structure.

Thus, step 206 transforms one data structure into another. Specifically, step 206 transforms the output data structure into the knowledge graph data structure. Both data structures store similar or the same information, but the information is stored in a structurally different manner.

Step 206 includes returning the knowledge graph data structure. Returning the knowledge graph data structure may take many different forms. For example, returning the graph data structure may be simply to store the knowledge graph data structure. In another example, the knowledge graph data structure may be returned by passing the knowledge graph data structure to some other computer executed algorithm. Specifically, the knowledge graph data structure may be passed to form preparation software which is programmed to read data stored in a graph data structure format.

The knowledge graph data structure may be returned using other procedures. For example, the knowledge graph data structure may be returned by converting the knowledge graph data structure into a visual form that displays the nodes as first shapes and displays the edges as second shapes that connect the first shapes. More specifically, the knowledge graph data structure may be converted into a hypertext markup language (HTML) file format. The HTML format is useful for instructing a computer to display information, such as on a web browser. Thus, returning the knowledge graph data structure may also include displaying a visual form of the knowledge graph data structure on a display device.

Figure 6:
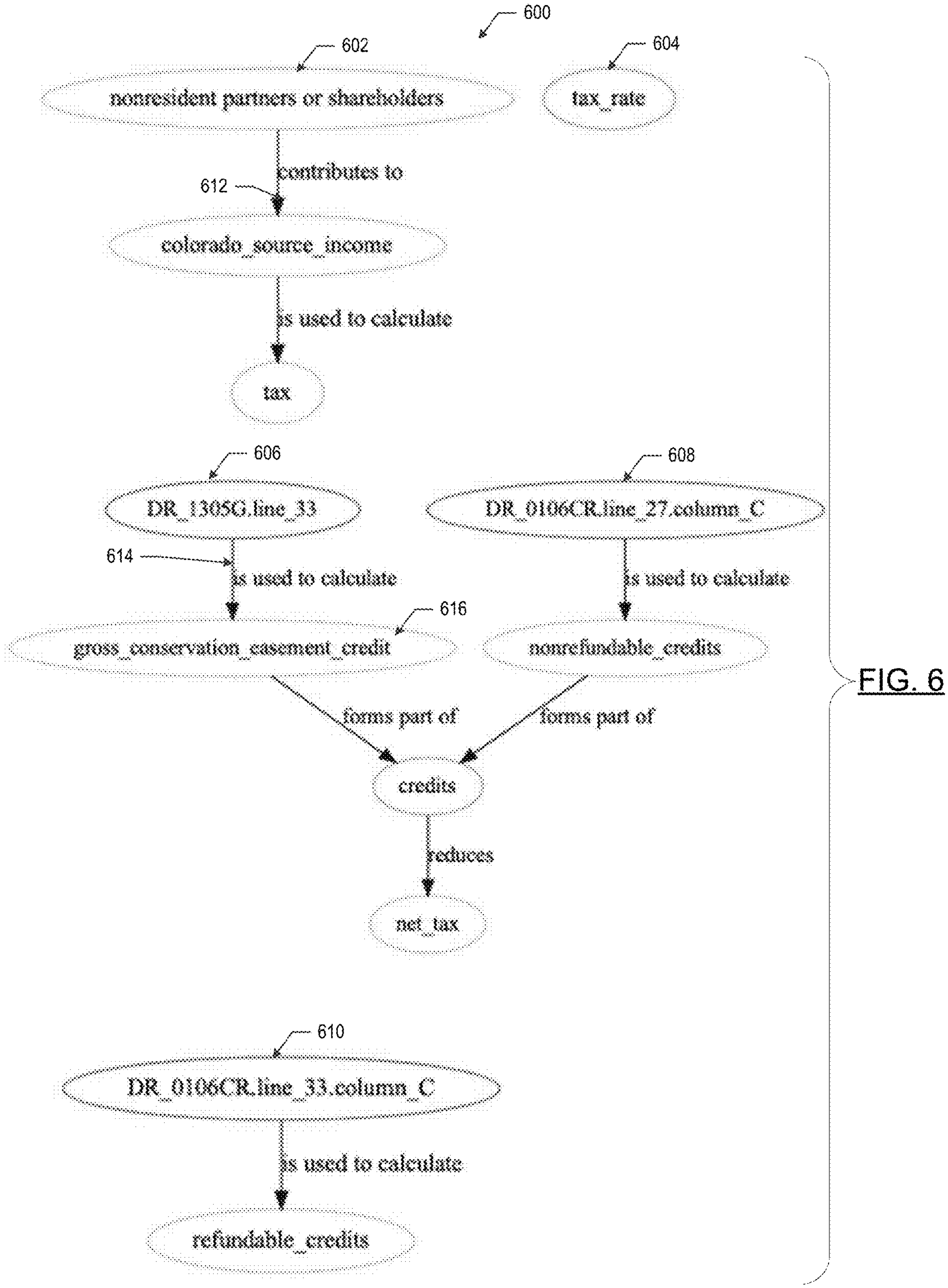
FIG. 6 shows an example of a knowledge graph data structure generated from the output data structure shown in FIG. 5, in accordance with one or more embodiments.

Still other changes may be made to the file format to be presented on the display device. For example, the nodes and edges of the displayed knowledge graph data structure may be highlighted according to a highlighting pattern. An example of a visually displayed knowledge graph data structure, together with visual highlighting in the forms of text and of different shading, is shown in FIG. 6.

While the various steps in flowchart of FIG. 2 are presented and described sequentially, at least some of the steps may be executed in different orders, may be combined or omitted, and at least some of the steps may be executed in parallel. Furthermore, the steps may be performed actively or passively.

FIG. 3 through FIG. 6 show an example of a method for enhanced automatic form processing using a knowledge graph data structure and a large language model. Thus, the computing system of FIG. 1 and the method of FIG. 2 may be applied to tax form (300) shown in FIG. 3 in order to generate the knowledge graph data structure (600) shown in FIG. 6.

The example of FIG. 3 through FIG. 6 is exemplary only and may be varied. For example, the computing system of FIG. 1 and the method of FIG. 2 may be applied to many different types of forms.

FIG. 3 shows an example of a tax form (300) that is to be converted into an electronic form suitable for processing by an automated form processing application, in accordance with one or more embodiments. Specifically, the tax form (300) is a SCORP Form 106 from a tax return for the State of Colorado of the United States of America. The tax form (300) is the starting point of the generation of an electronic form, which a computer may process automatically using tax preparation software.

The tax form (300) includes a section (302). The section indicates the portion of the tax form (300) that includes a collection of related fields and values. For example, the section (302) of the tax form (300) contains the fields and values that relate to composite nonresident income tax. The electronic form may be generated section-by-section, in some embodiments, in order to establish the relationships between sections in a knowledge graph data structure.

The tax form (300) also includes six fields represented by the numbered cells, such as field (304) in the cell numbered "11" and field (306) in the cell numbered "12." The method of FIG. 2 identifies the fields in the tax form (300) and, from the fields, generates the keys of the key-value pairs in the object notation data structure, as described above and exemplified below. The identity of the fields in the object notation data structure may be the text shown in the fields (e.g., name of the field (302) in the object notation data structure may be the text shown in the field (302)) or may be a summary of the text shown in the fields (as shown in the key (402) shown in FIG. 4).

The tax form (300) also includes six corresponding blank entries, such as blank entry (308). The method of FIG. 2 identifies the blank entries in the tax form (300) and, from the blank entries, generates the values of the key-value pairs in the object notation data structure, as described above and exemplified below. Thus, for example, at least a range of allowed values is defined as a "value" (of a key-value pair) for the blank entry (308) corresponding to the "key" (of a key-value pair) defined for the field (302) in the tax form (300).

FIG. 4A and FIG. 4B show an example of an object notation data structure created from the electronic form (300) shown in FIG. 3, in accordance with one or more embodiments. FIG. 4A and FIG. 4B should be considered together as a whole. Thus, the top line of FIG. 4B is read immediately after the bottom line of FIG. 4A, with FIG. 4A and FIG. 4B together forming one object notation data structure (400).

The object notation data structure (400) includes six keys, corresponding to the six fields shown in FIG. 3. Thus, for example, key (402) and key (404) are keys in the object notation data structure (400). In the example of FIG. 4A and FIG. 4B, the identity of the key (402) is a summary of the text in the field (304) in the tax form (300) of FIG. 3 (i.e., the identity of the key (402) is "colorado_source_income"). Similarly, the identity of the key (404) is a summary of the text in field (306) in the tax form (300) (i.e., the identity of the key (404) is "nunrefundable_credits").

Each of the keys in the object notation data structure (400) has a corresponding value. Thus, for example, the key (402) has a value A (406) defined by the entries between the brackets that contain reference numeral 406 in FIG. 4A.

Similarly, the key (404) has a value B (408) defined by the entries between the brackets that contain reference numeral 408 in FIG. 4A.

Each of the values in the object notation data structure (400) has five sub-values. A first of the sub-values is "field name," such as sub-value 1A (410) in the value A (406) or the sub-value 1B (412) in the value B (408). The first sub-value (e.g., the sub-value 1A (410) and the sub-value 1B (412)) includes an entry that serves as an identifier for the corresponding value, and thus also represents a name of the field of the electronic form.

A second of the sub-values is "filing details," such as sub-value 2A (414) in the value A (406) or the sub-value 2B (416) in the value B (408). The second sub-value (e.g., the sub-value 2A (414) and the sub-value 2B (416)) includes an entry that presents natural language instructions for properly entering the correct numerical value that should be entered into the corresponding blank on the tax form (300) shown in FIG. 3. Thus, the second sub-value in each of the values represents natural language instructions for determining the range of allowed values for the field.

A third of the sub-values is "required," such as sub-value 3A (418) in the value A (406) or the sub-value 3B (420) in the value B (408). The third sub-value (e.g., the sub-value 3A (418) and the sub-value 3B (420)) includes an entry that defines whether a numerical value must be entered in the corresponding blank on the tax form (300) shown in FIG. 3. Thus, the third sub-value in each of the values represents a determination whether the range of values is required.

A fourth of the sub-values is "possible values," such as sub-value 4A (422) in the value A (406) or the sub-value 4B (424) in the value B (408). The fourth sub-value (e.g., the sub-value 4A (422) and the sub-value 4B (424)) includes an entry that defines a range of numerical values that may be entered in the corresponding blank on the tax form (300) shown in FIG. 3. Thus, the fourth sub-value in each of the values represents a range of allowed values for the field of the tax form (300) shown in FIG. 3.

A fifth of the sub-values is "calc logic," such as sub-value 5A (426) in the value A (406) or the sub-value 5B (428) in the value B (408). The fifth sub-value (e.g., the sub-value 5A (426) and the sub-value 5B (428)) includes an entry that defines computer-readable text or computer-readable code used for calculating the numerical value that will be placed in the corresponding blank shown in FIG. 3. Thus, the fifth sub-value in each of the values represents calculation logic which, when executed by a processor, determines a specific value for the field.

FIG. 4C shows an example of a prompt used during execution of a large language model on the electronic form shown in FIG. 3, in accordance with one or more embodiments. Specifically, the prompt shown in FIG. 4C is provided, together with the electronic form, as input to a large language model during generation of the object notation data structure shown in FIG. 4A and FIG. 4B. In FIG. 4C, the term "you" is an instruction directed to the large language model. The prompt (450) in FIG. 4C is used during step 200 of FIG. 2, in the case that receiving the object notation data structure includes generating the object notation data structure.

The prompt (450) includes a system instruction (452) that defines the command that the large language model will execute with respect to the form in order to generate the object notation data structure. The prompt (450) includes parameters (454) that further constrain what information the large language model should extract, constrain how the information should be extracted, and constrain the format in which the information should be placed. In the example of FIG. 4C, the format being required is the JSON format, which is an object notation data structure format.

FIG. 5 shows an example of an output data structure, generated using a large language model applied the object notation data structure shown in FIG. 4A and FIG. 4B, in accordance with one or more embodiments. The output data structure (500) is a text string generated according to the procedure described with respect to step 202 of FIG. 2.

As shown, the output data structure (500) is a text string. The text string identifies the keys of the object notation data structure (400) in FIG. 4A and FIG. 4B as nodes. The text string identifies the relationships among the key-value pairs of the object notation data structure (400) in FIG. 4A and FIG. 4B as edges. Thus, the edges in the text string also define the relationships among the fields in the tax form (300) shown in FIG. 3.

Other information may be added to the output data structure (500) by changing or adding to the prompt used to generate the output data structure (500). For example, the output data structure (500) includes information defining the colors to be used to highlight the nodes. While the colors are only named in text format, the colors named in the output data structure (500) are used by the object data model at step 206 of FIG. 2 when returning the knowledge graph data structure includes displaying the knowledge graph data structure as a visual object.

FIG. 6 shows an example of a knowledge graph data structure generated from the output data structure shown in FIG. 5, in accordance with one or more embodiments. Specifically, the knowledge graph data structure (600) shown in FIG. 6 is in a visual form. The knowledge graph data structure (600) is formed by applying an object notation model to the output data structure (500) shown in FIG. 5, in the manner described with respect to step 204 of FIG. 2.

While the knowledge graph data structure (600) includes multiple sections that form multiple root nodes (e.g., root node (602), root node (604), root node (606), root node (608), and root node (610)), the set of all of the root nodes form the knowledge graph data structure (600). While the knowledge graph data structure (600) is shown in a visual form in FIG. 6, the knowledge graph data structure (600) also may be stored in a computer-readable form. Thus, the knowledge graph data structure (600) also may be processed by form preparation software.

In the knowledge graph data structure (600), the nodes (such as root node (602) or root node (608)) are represented by ellipses that surround text that identifies the keys of the object notation data structure shown in FIG. 4A and FIG. 4B (and hence also identify the fields of the form shown in FIG. 3). The different shading of the ellipses conveys information, such as the type of the key.

The edges (such as edge (612) or edge (614)) show the relationships among the key-value pairs in the object notation data structure shown in FIG. 4A and FIG. 4B. Thus, the edges also show the relationships between the fields in the form shown in FIG. 3. For example, the edge (612) indicates that relationship between the root node (606) and the dependent node (616). Text associated with each node may visually indicate or highlight the nature of relationships between pairs of nodes. For example, the text associated with the edge (614) indicates that the root node (606) is used to calculate the dependent node (616).

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

As can be seen from the example of FIG. 3 through FIG. 6, one or more embodiments may provide for automatically determining the logical flow and characteristics of a complex electronic form. For example, the calculation logic for the form in FIG. 3 is automatically determined and placed in the object notation data structure (400) of FIG. 4A and FIG. 4B, and thence remains available (if hidden) in the output data structure (500) of FIG. 5 and the knowledge graph data structure (600) of FIG. 6. Thus, one or more embodiments can generate, automatically, the logical flow and understanding of an electronic form that may use user input and has specific instructions.

Figure 7A:
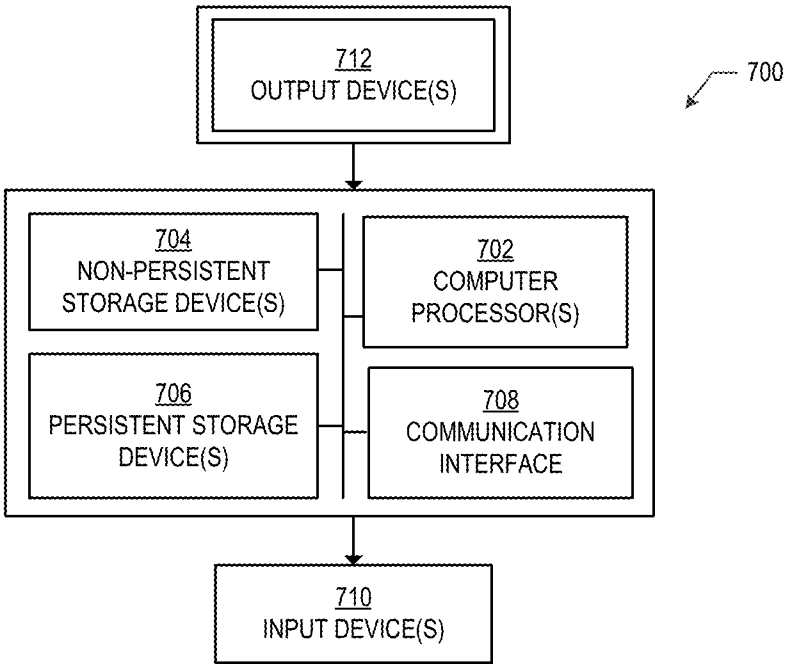
FIG. 7A and FIG. 7B show an example of a computing system and network environment, in accordance with one or more embodiments.

For example, as shown in FIG. 7A, the computing system (700) may include one or more computer processor(s) (702), non-persistent storage device(s) (704), persistent storage device(s) (706), a communication interface (708) (e.g., Bluetooth interface, infrared interface, network interface, optical interface, etc.), and numerous other elements and functionalities that implement the features and elements of the disclosure. The computer processor(s) (702) may be an integrated circuit for processing instructions. The computer processor(s) (702) may be one or more cores or micro-cores of a processor. The computer processor(s) (702) includes one or more processors. The computer processor(s) (702) may include a central processing unit (CPU), a graphics processing unit (GPU), a tensor processing unit (TPU), combinations thereof, etc.

The input device(s) (710) may include a touchscreen, keyboard, mouse, microphone, touchpad, electronic pen, or any other type of input device. The input device(s) (710) may receive inputs from a user that are responsive to data and messages presented by the output device(s) (712). The inputs may include text input, audio input, video input, etc., which may be processed and transmitted by the computing system (700) in accordance with one or more embodiments. The communication interface (708) may include an integrated circuit for connecting the computing system (700) to a network (not shown) (e.g., a local area network (LAN), a wide area network (WAN) such as the Internet, mobile network, or any other type of network) or to another device, such as another computing device, and combinations thereof.

Further, the output device(s) (712) may include a display device, a printer, external storage, or any other output device. One or more of the output devices may be the same or different from the input device(s) (710). The input and output device(s) may be locally or remotely connected to the computer processor(s) (702). Many different types of computing systems exist, and the aforementioned input and output device(s) may take other forms. The output device(s) (712) may display data and messages that are transmitted and received by the computing system (700). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (702), is configured to perform one or more embodiments, which may include transmitting, receiving, presenting, and displaying data and messages described in the other figures of the disclosure.

Figure 7B:
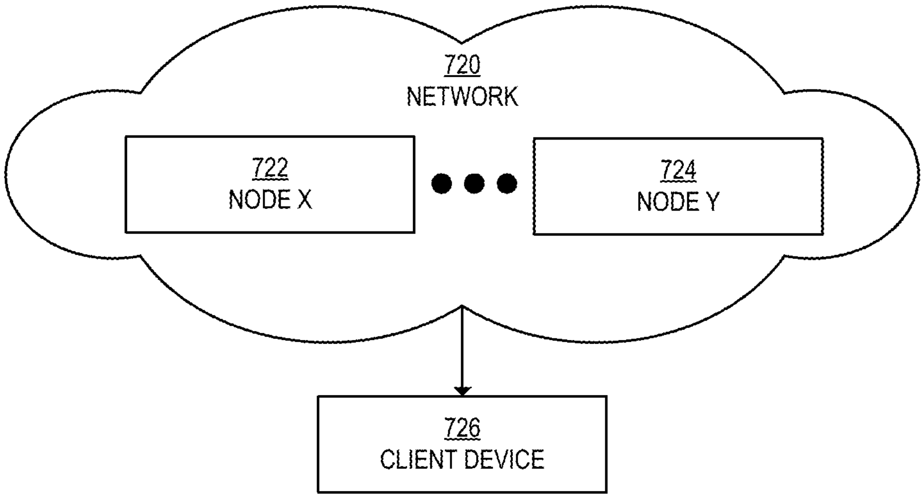

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

The nodes (e.g., node X (722), node Y (724)) in the network (720) may be configured to provide services for a client device (726), including receiving requests and transmitting responses to the client device (726). For example, the nodes may be part of a cloud computing system. The client device (726) may be a computing system, such as the computing system shown in FIG. 7A. Further, the client device (726) may include or perform all or a portion of one or more embodiments.

The computing system of FIG. 7A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

receiving an object notation data structure comprising a plurality of key-value pairs, wherein:

each key in the plurality of key-value pairs represents a field of an electronic form, each value in the plurality of key-value pairs comprises at least a first sub-value and a second sub-value for the field that corresponds to the value, the first sub-value represents a name of the field of the electronic form, and the second sub-value represents a range of allowed values for the field of the electronic form;

applying a large language model to the object notation data structure to generate an output data structure, wherein the output data structure comprises a text string defining fields of the electronic form as nodes and further defining a plurality of relationships among the key-value pairs as edges between the nodes;

applying an object notation model to the output data structure to convert the output data structure into a knowledge graph data structure comprising the nodes connected by the edges; and returning the knowledge graph data structure.

2. The method of claim 1, wherein each value in the plurality of key-value pairs further comprises a third sub-value for the field, and wherein the third sub-value represents natural language instructions for determining the range of allowed values for the field.

3. The method of claim 1, wherein each value in the plurality of key-value pairs further comprises a third sub-value for the field, and wherein the third sub-value represents a determination whether the range of values is required.

4. The method of claim 1, wherein each value in the plurality of key-value pairs further comprises a third sub-value for the field, and wherein the third sub-value represents calculation logic which, when executed by a processor, determines a specific value for the field.

5. The method of claim 1, wherein each value in the plurality of key-value pairs further comprises:

a third sub-value for the field, wherein the third sub-value represents natural language instructions for determining the range of allowed values for the field;

a fourth sub-value for the field, wherein the fourth sub-value represents a determination whether the range of values is required; and a fifth sub-value for the field, wherein the fifth sub-value represents calculation logic which, when executed by a processor, determines a specific value for the field.

6. The method of claim 1, further comprising:

generating, prior to applying the large language model, a prompt, wherein the prompt instructs the large language model how to apply the large language model to the plurality of key-value pairs.

7. The method of claim 1, further comprising:

generating, prior to applying the large language model, a prompt, wherein the prompt is defined specifically for the electronic form, and wherein the prompt instructs the large language model how to apply the large language model to the plurality of key-value pairs.

8. The method of claim 1, wherein the knowledge graph data structure comprises the nodes connected by the edges.

9. The method of claim 1, wherein the object notation model comprises a class defined from an object notation library.

10. The method of claim 1, wherein returning the knowledge graph data structure comprises:

storing the knowledge graph data structure.

11. The method of claim 1, wherein returning the knowledge graph data structure comprises:

converting the knowledge graph data structure into a visual form that displays the nodes as first shapes and the edges as second shapes that connect the first shapes; and displaying the visual form on a display device.

12. The method of claim 11, further comprising:

highlighting the nodes and the edges according to a highlighting pattern.

13. The method of claim 1, further comprising:

applying a parsing algorithm to the electronic form to generate the object notation data structure comprising the plurality of key-value pairs.

14. The method of claim 1, further comprising:

applying a parsing algorithm to the electronic form to generate the object notation data structure comprising the plurality of key-value pairs; and applying the large language model to the electronic form to generate at least one field of the fields that requires a calculation.

15. The method of claim 14, further comprising:

adding, as a third sub-value of each value, a logical expression that defines the calculation as computer-readable instructions.

16. The method of claim 1, further comprising:

extracting natural language instructions for the field from a heterogeneous data source;

applying the large language model to the natural language instructions to generate processed instructions; and adding, as a third sub-value for each value, the processed instructions.

17. A method comprising:

applying a parsing algorithm to an electronic form to generate an object notation data structure comprising a plurality of key-value pairs, wherein:

each key in the plurality of key-value pairs represents a field of an electronic form, each value in the plurality of key-value pairs comprises at least a first sub-value, a second sub-value, a third sub-value, a fourth sub-value, and a fifth sub-value for the field of the electronic form that corresponds to the value, the first sub-value represents a name of the field of the electronic form, the second sub-value represents a range of allowed values for the field of the electronic form, the third sub-value represents natural language instructions for determining the range of allowed values for the field of the electronic form, the fourth sub-value represents a determination whether the range of values is required, and the fifth sub-value represents calculation logic which, when executed by a computer processor, determines a specific value for the field of the electronic form;

generating a prompt, wherein the prompt instructs a large language model how to apply the large language model to the plurality of key-value pairs;

applying, using the prompt, the large language model to the object notation data structure to generate an output data structure, wherein the output data structure comprises a text string defining fields of the electronic form as nodes and further defining a plurality of relationships among the key-value pairs as edges between the nodes;

applying an object notation model to the output data structure to convert the output data structure into a knowledge graph data structure comprising the nodes connected by the edges;

applying the large language model to the plurality of relationships to generate summaries of the plurality of relationships;

converting the knowledge graph data structure into a visual form that:

displays the nodes as first shapes and the edges as second shapes that connect the first shapes, displays node text identifying the nodes as the fields, and displays edge text comprising the summaries; and displaying the visual form on a display device.

18. A system comprising:

a computer processor;

a data repository in communication with the computer processor and storing:

an object notation data structure comprising a plurality of key-value pairs, wherein:

each key in the plurality of key-value pairs represents a field of an electronic form, each value in the plurality of key-value pairs comprises at least a first sub-value and a second sub-value for the field of the electronic form that corresponds to the value, the first sub-value represents a name of the field of the electronic form, and the second sub-value represents a range of allowed values for the field of the electronic form, an output data structure comprising a text string defining fields of the electronic form as nodes and further defining a plurality of relationships among the key-value pairs as edges between the nodes, and a knowledge graph data structure comprising the nodes connected by the edges;

a large language model which, when executed by the computer processor, takes the object notation data structure as a first input and generates the output data structure as a first output; and an object notation model which, when executed by the processor, takes the output data structure as a second input and generates, as a second output, the knowledge graph data structure.

19. The system of claim 18, further comprising:

a display device in communication with the computer processor and configured to display the knowledge graph data structure.

20. The system of claim 18, further comprising:

form preparation software executable by the computer processor, wherein the object notation model, when executed by the computer processor, further embeds, in the object notation model, calculation logic for the fields as computer-readable instructions, and wherein the form preparation software is programmed to execute the calculation logic.

* * * * *